J. L. CREVELING.
ELECTRIC DISTRIBUTION.
APPLICATION FILED FEB. 2, 1909.
1,009,831.
Patented Nov. 28, 1911.
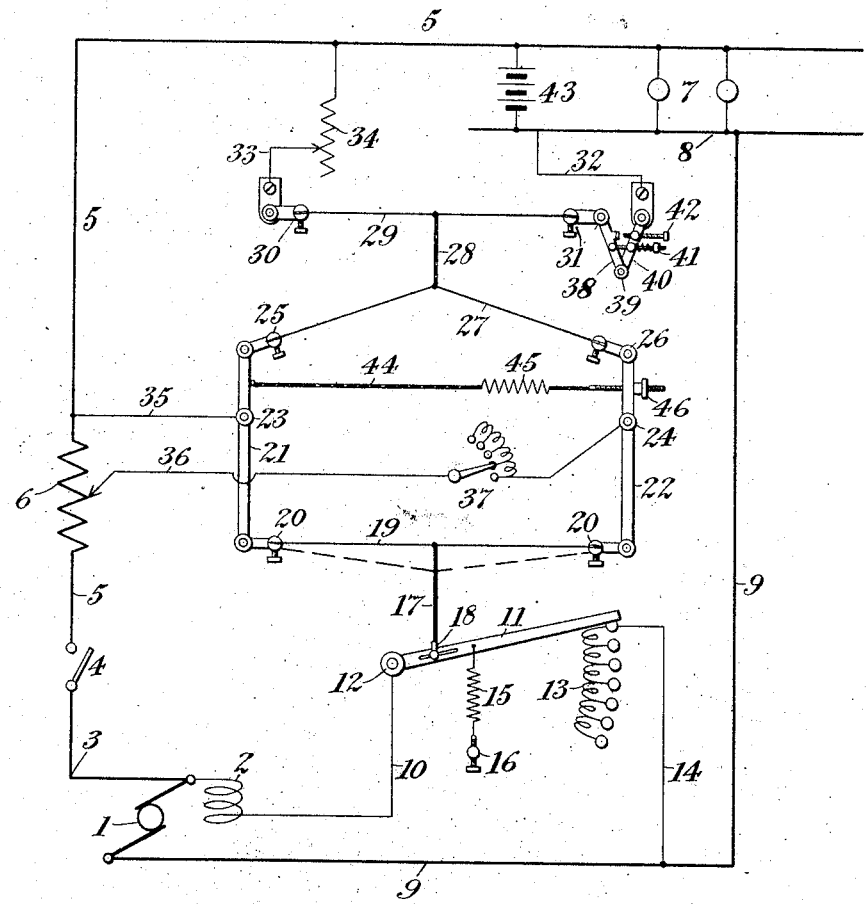
Witnesses:
Chas. D. King
C. J. Stockly
Inventor
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC DISTRIBUTION.

1,009,831.     Specification of Letters Patent.     Patented Nov. 28, 1911.

Application filed February 2, 1909. Serial No. 475,576.

*To all whom it may concern:*

Be it known that I, JOHN L. CREVELING, a resident of New York, in the county and State of New York, have invented a certain new and useful Improvement in Electric Distribution, as set forth in the annexed specification and drawing, forming a part thereof.

My invention pertains to that class or systems of electrical distribution employing a generator, a storage battery and lamps or other translating devices and has for its principal object to provide means whereby the generator may be automatically governed according to predetermined conditions.

The drawing is a diagrammatic representation of a system of electrical distribution embodying my invention in a simple form.

Referring to the drawing, (1) represents a dynamo or generator provided with a field winding (2). One of the leads (3) is connected to the switch (4) which is preferably of the automatic variety, adapted to close the circuit when the voltage of the generator shall equal that of the storage battery and open the circuit when the generator voltage shall fall slightly below that of the battery. As the particular construction of this switch forms no part of my present invention, details further than a mere indication of its presence, are omitted. A good switch for this office is shown in my Patent No. 707,763. From the other side of this switch the main (5) leads to a low resistance device (6), the function of which will hereinafter more plainly appear, and from the other side of which the lead (5) continues to one side of the storage battery (43) and lamps or translating devices (7), the other side of which is in connection with the main (8), from which the lead (9) is carried to the other side of the generator (1).

The field coil (2) is connected with one side of the generator and has its other terminal connected with the wire (10) which communicates with the lever (11), pivoted as at (12) and engaging the resistance device (13) which is connected with the lead (9), as by wire (14), in such manner that the position of the lever (11) determines the amount of resistance inserted in the field circuit.

(15) represents a spring, adjustable as by the screw (16) and tending to insert resistance (13) into the generator field circuit.

A cord or other equivalent non-conducting member (17) is adjustably attached to the lever (11) as by means of the adjustable connection (18), and has its other extremity attached to the wire (19), normally held taut between the binding posts (20) which are carried by the levers (21) and (22), pivoted as at (23) and (24), and provided at their opposite extremities with binding posts (25) and (26) carrying the flexible wire (27) which is normally held taut as shown in the drawing by the cord or other insulating member (28), suspended from the wire (29) which is held between the binding post (30), and the post (31) in a manner which will hereinafter more plainly appear. The wire (32) connects one side of the storage battery with one end of the wire (29), and wire (33) connects the other end of the wire (29) with the adjustable resistance (34) which is in connection with the other side of the battery (43). The wire (35) connects the lever (21) with the main (5) on one side of the resistance (6), while the wire (36) connects the lever (22) with some portion of the resistance (6) in such manner that the amount of resistance shunted by the wires (35) and (36) may be varied. The variable resistance (37) is placed in the line (36) for the purpose of adjustment.

The binding post (31), to which is attached one end of the wire (29), is carried by the lever (38), pivoted as at 39 to the lever (40). The adjustable spring (41) tends to draw the levers (38) and (40) together in such manner as to hold the wire (29) taut and take up any expansion of the same, until the adjusting screw (42) shall arrest the motion of the lever (38), when further expansion of the wire (29) will cause a sag therein.

(44) represents a cord or other non-conducting member, (45) a spring and (46) an adjustment therefor, which may be used if desired to normally assist in placing wire (19) under slight tension, for the purpose of adjustment.

The operation of my improvement in electrical distribution is substantially as follows: starting with the various instrumentalities in the positions shown in the drawing. If the armature (1) be revolved, the field of the generator will build up in a well known manner and when the generator shall have reached a proper voltage the switch (4) will close and current will flow from the generator through the main (3), switch (4), main (5), resistance (6) and main (5) to the storage battery (43), lamps or translating devices (7), to main (8) and thence back to the generator through the main (9). The field current will flow through coil (2), wire (10), lever (11), wire (14) and lead (9) to the generator until the position of the lever (11) shall be so altered as to insert a portion of the resistance (13). A portion of the current will divide at the resistance (6) and pass through wire (36) and adjustable resistance (37) to the lever (22), where it will divide and flow back to lever (21) through wires (19) and (27), and from lever (21) it will return to the lead (5) through wire (35). The current passing through wires (19) and (27) will tend to heat and elongate the same so as to tend to cause the wire (19) to sag, as shown in the dotted line, and in this way allow the spring (15) to insert resistance (13) into the field circuit and cut down the output of the generator. By proper adjustment of the shunt (6) and resistance (37), springs (45) and (15), and by proper selection of the wires (19) and (27), a considerable movement may be given to the lever (11) upon rise in current above a given amount through the shunt (6), in such manner that the expansion of the wires (19) and (27), coöperating with the levers (21) and (22), may cause a considerable movement to the lever (11), in such manner as to hold the generator output practically constant throughout wide changes in speed of the same. A portion of the current will also flow from the main (5) to the battery main (8) through the resistance (34), wire (33), wire (29), levers (38) and (40), and wire (32), and by proper adjustment of the spring (41) and screw (42) and wire (29), the elongation of the wire (29) due to the normal voltage across the battery will be taken up by the spring (41), while, if the battery be raised above its voltage, the screw (42) will stop the motion of the lever (38) so that the same will not take up the slack in wire (29), whereupon the same will sag and allow the wire (27) to straighten and thus increase the sag in wire (19) through the instrumentality of levers (21) and (22) in such manner as to assist in increasing the movement of the lever (11) in such manner as to cut down the output of the generator. Further rise in current or voltage will increase the above named effects, while any decrease in current or voltage will cause a change in the reverse thereof.

I do not wish to limit myself to any details of construction shown in the drawing which is a mere diagrammatic representation of a simple form of apparatus embodying my invention, and it is obvious that great variation in the way of construction may be made without departing from the sprit of my invention, which is as set forth in the following claims, to wit:—

1. The combination with a generator, a storage battery, a translation circuit, means for governing the output of the generator, a wire carrying a portion of the current generated, and means whereby expansion of said wire operates the generator governing means, of means responsive to voltage fluctuations for coöperating with said wire in the operation of the generator governing means.

2. The combination with a dynamo or generator, a work circuit, means for governing the output of said generator, a divided circuit carrying a portion of the current generated, and means whereby expansion of the conductors forming said divided circuit varies the output of the generator, of means whereby changes in voltage upon said work circuit affect the generator governing means.

3. The combination with a generator, storage battery, translating devices, means for regulating the output of the generator comprehending a conductor carrying a portion of the current generated, and means whereby expansion of said conductor varies the output of the generator, of means for varying the effect of said expansion depending upon the voltage across a circuit supplied by said generator.

4. The combination with a dynamo or generator, a storage battery, a work circuit containing translating devices, and a regulator governing the output of the generator of a conducting expansion member in electrical connection with the work or translation circuit and means whereby the expansion of said conducting member tends to assist in the regulation of the generator.

5. The combination with a generator, an automatic generator regulator and a work circuit, of a conducting member in electrical communication with the work circuit and means whereby the effect of current passing through said conducting member, so as to cause the same to expand, tends to alter the output of the generator.

6. Means for regulating the output of a generator, comprising a plurality of conducting members the length of which determines the regulation of the generator, and means whereby current flowing through said conducting members and causing a sag therein operates the dynamo regulating means combined with voltage operated means for modifying the effect of said regulating means.

7. The combination with a generator and its field circuit, means for regulating the said field circuit comprising a plurality of conducting members, and means whereby the expansion of said members is added in such manner as to produce a combined effect in regulating said field circuit of independently operated means for modifying the effect of said expansion.

8. The combination with a dynamo or generator, a work circuit, and means governing the output of said generator, an expansion wire carrying a portion of the current generated and operating said governing means, of an expansion wire, the length of which depends upon the voltage across the work circuit, and means whereby the expansion of the above named expansion wires coöperates to govern the output of the generator.

9. The combination with a generator, a work circuit, means for regulating the output of the generator comprehending a conductor carrying a portion of the current generated and means whereby expansion of said conductor governs the output of the generator, of means for varying the effect of said expansion in governing the generator depending upon the voltage across a circuit supplied by said generator.

10. The combination with a generator, a work circuit, means for regulating the output of the generator comprehending a conductor carrying a portion of the current generated and means whereby expansion of said conductor governs the output of the generator, of means for varying the effect of said expansion in governing the generator depending upon the voltage across the work circuit.

11. The combination with a generator, a work circuit and a regulator governing the output of the generator, of a conducting expansion member in electrical connection with the work circuit and means whereby the expansion of said connecting members tends to assist the generator regulator in the regulation of the generator.

12. The combination with a generator, an automatic generator regulator and a work circuit, of a conducting member in electrical communication with the work circuit, means whereby the effect of current passing through said conducting member, causing the same to expand, tends to alter the output of the generator and means for governing the point of alteration of said output.

13. The combination with a generator, an automatic generator regulator and a work circuit, of a conducting member in electrical communication with the work circuit, means whereby the effect of current passing through said conducting member, causing the same to expand, tends to alter the output of the generator and means for adjusting the effect of the expansion of said member.

JOHN L. CREVELING.

Witnesses:
G. R. JEWETT,
C. J. STOCKLEY.

---

It is hereby certified that in Letters Patent No. 1,009,831, granted November 28, 1911, upon the application of John L. Creveling, of New York, N. Y., for an improvement in "Electric Distribution," an error appears in the printed specification requiring correction as follows: Page 3, line 44, for the words "connecting members" read *conducting member;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*